(12) United States Patent
Beier et al.

(10) Patent No.: US 12,554,744 B2
(45) Date of Patent: Feb. 17, 2026

(54) DATA SYNCHRONIZATION IN A DATA ANALYSIS SYSTEM COMPRISING A DATA STORE AND A METADATA STORE

(71) Applicant: International Business Machines Corporation, Armonk, NY (US)

(72) Inventors: Felix Beier, Haigerloch (DE); Vassil Radkov Dimov, Stuttgart (DE); Dennis Butterstein, Leinfelden-Echterdingen (DE); Björn Broll, Waldenbuch (DE); Dominik Diedrich, Illingen (DE); Saransh Gupta, Sunnyvale, CA (US); Daniel Waddington, Morgan Hill, CA (US); Clement Lambert Dickey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/885,216

(22) Filed: Sep. 13, 2024

(65) Prior Publication Data

US 2025/0384058 A1    Dec. 18, 2025

Related U.S. Application Data

(60) Provisional application No. 63/659,340, filed on Jun. 13, 2024.

(51) Int. Cl.
*G06F 16/27* (2019.01)
*G06F 16/21* (2019.01)
(Continued)

(52) U.S. Cl.
CPC .......... *G06F 16/278* (2019.01); *G06F 16/219* (2019.01); *G06F 16/2282* (2019.01); *G06F 16/2379* (2019.01)

(58) Field of Classification Search
CPC ... G06F 16/278; G06F 16/219; G06F 16/2282
See application file for complete search history.

(56) References Cited

U.S. PATENT DOCUMENTS

| 6,052,763 A | 4/2000 | Maruyama |
|---|---|---|
| 7,974,943 B2 | 7/2011 | Gilbert et al. |

(Continued)

FOREIGN PATENT DOCUMENTS

| CN | 111061740 A | * | 4/2020 | ......... G06F 16/2282 |
|---|---|---|---|---|
| CN | 113139017 A | * | 7/2021 | ............ G06F 16/27 |

(Continued)

OTHER PUBLICATIONS

Ahluwalia et al., Target-based database synchronization, Proceedings of the 2010 ACM Symposium on Applied Computing, Mar. 22, 2010, 1643-1647 pp.

(Continued)

*Primary Examiner* — Neveen Abel Jalil
*Assistant Examiner* — Hubert Cheung
(74) *Attorney, Agent, or Firm* — Michael O'Keefe

(57) ABSTRACT

The present disclosure relates to a method. A main transaction may be received. The main transaction comprises a set of change records of the at least one source table. Each change record represents at least one data record of a source table of the at least one source table. A least one subset of change records of the set of change records may be determined. Each subset of change records is determined such that it represents a distinct source partition of the at least one source table. A sub-transaction may be determined per subset of change records of the at least one subset of change records. The main transaction may be executed by at least concurrently executing the set of sub-transactions, wherein the execution of each sub-transaction of the sub-transactions (Continued)

comprises concurrently adapting a data store and adapting a metadata store in accordance with the sub-transaction.

19 Claims, 10 Drawing Sheets

(51) Int. Cl.
*G06F 16/22* (2019.01)
*G06F 16/23* (2019.01)

(56) References Cited

U.S. PATENT DOCUMENTS

| | | | | |
|---|---|---|---|---|
| 9,418,134 | B2* | 8/2016 | Cadarette | G06F 16/256 |
| 10,055,440 | B2* | 8/2018 | Bensberg | G06F 16/2282 |
| 10,754,875 | B2* | 8/2020 | Brodt | G06F 16/275 |
| 11,334,600 | B1 | 5/2022 | Guo et al. | |
| 11,520,781 | B2* | 12/2022 | Stolze | G06F 16/24568 |
| 11,573,936 | B2* | 2/2023 | Stolze | G06F 16/2282 |
| 11,797,570 | B2* | 10/2023 | Beier | G06F 11/1471 |
| 11,934,424 | B1* | 3/2024 | Holenstein | G06F 16/27 |
| 12,361,022 | B2* | 7/2025 | Stolze | G06F 16/278 |
| 2014/0156595 | A1* | 6/2014 | Rose | G06F 16/27 707/625 |
| 2018/0137187 | A1 | 5/2018 | Brodt et al. | |
| 2019/0163754 | A1* | 5/2019 | Huang | G06F 16/2255 |
| 2020/0034365 | A1* | 1/2020 | Martin | G06F 16/24554 |
| 2020/0117680 | A1* | 4/2020 | Bapat | G06F 9/546 |
| 2020/0265026 | A1* | 8/2020 | Gruszecki | G06F 16/2282 |
| 2020/0301947 | A1 | 9/2020 | Botev et al. | |
| 2020/0320051 | A1* | 10/2020 | Lee | G06F 16/2282 |
| 2022/0083540 | A1* | 3/2022 | Stolze | G06F 16/2282 |
| 2022/0284034 | A1* | 9/2022 | Stolze | G06F 11/3476 |
| 2023/0052786 | A1* | 2/2023 | Bose | G06F 16/214 |
| 2023/0101740 | A1* | 3/2023 | Beier | G06F 11/1471 707/610 |
| 2023/0153314 | A1* | 5/2023 | Martin | G06F 16/2282 707/746 |
| 2023/0153327 | A1* | 5/2023 | Stolze | G06F 16/27 707/634 |
| 2023/0259521 | A1* | 8/2023 | Haelen | G06F 16/254 707/602 |
| 2024/0202197 | A1* | 6/2024 | Ma | G06F 16/285 |
| 2024/0320237 | A1* | 9/2024 | Simanjuntak | G06F 16/278 |

FOREIGN PATENT DOCUMENTS

| | | | | |
|---|---|---|---|---|
| CN | 116303510 | A * | 6/2023 | G06F 16/2379 |
| CN | 116521672 | A * | 8/2023 | G06F 16/2282 |

OTHER PUBLICATIONS

Disclosed Anonymously, Mechanism for Automated Enablement of Replication from a Source Database System to a Target Database System, IPCOM000267627D, Nov. 11, 2021, 8 pages.

* cited by examiner

DATA SYNCHRONIZATION IN A DATA ANALYSIS SYSTEM COMPRISING A DATA STORE AND A METADATA STORE

BACKGROUND

The present invention relates to the field of digital computer systems, and more specifically, to a method for data synchronization in a data analysis system comprising a data store and a metadata store.

A data lake may be a centralized repository that may allow to store structured and unstructured data at any scale. A data warehouse may be a centralized repository designed for query and analysis. It enables organizations to consolidate data from various systems, transform it into a consistent format, and make it available for business intelligence (BI) and analytics. A data lakehouse may provide an architectural approach that combines the benefits of data lakes and data warehouses to offer a unified platform for data management and analytics.

SUMMARY

Various embodiments provide a method for data synchronization in a data analysis system comprising a data store and a metadata store, computer program product and computer system as described by the subject matter of the independent claims. Advantageous embodiments are described in the dependent claims. Embodiments of the present invention can be freely combined with each other if they are not mutually exclusive.

In one aspect, the invention relates to a method for data synchronization in a data analysis system, the data analysis system comprising a source database system and a target database system, the source database system comprising at least one source table, wherein the at least one source table comprises partitions, referred to as source partitions, the target database system comprising a data store and a metadata store, the data store being configured to comprise at least one target table corresponding to the at least one source table respectively, the metadata store being configured to comprise metadata descriptive of the at least one target table; the method comprising: receiving a transaction, referred to as main transaction, the main transaction comprising a set of change records of the at least one source table, each change record representing a data record of a source table of the at least one source table; determining at least one subset of change records of the set of change records where each subset of change records represents a distinct source partition of the at least one source table; determining a transaction, referred to as sub-transaction, per subset of change records of the at least one subset of change records, resulting in a set of one or more sub-transactions; executing the main transaction, the executing of the main transaction comprising concurrently executing the set of sub-transactions, wherein the executing of each sub-transaction of the set of sub-transactions comprises: concurrently adapting the data store and adapting the metadata store in accordance with the sub-transaction.

In one aspect the invention relates to a computer program product comprising a computer-readable storage medium having computer-readable program code embodied therewith, the computer-readable program code configured to implement the method of the above embodiment.

In one aspect the invention relates to a computer system for data synchronization in a data analysis system, the data analysis system comprising a source database system and a target database system, the source database system comprising at least one source table, wherein the at least one source table comprises partitions, referred to as source partitions, the target database system comprising a data store and a metadata store, the data store being configured to comprise at least one target table corresponding to the at least one source table respectively, the metadata store being configured to comprise metadata descriptive of the at least one target table; the computer system being configured for: receiving a transaction, referred to as main transaction, the main transaction comprising a set of change records of the at least one source table, each change record representing a data record of a source table of the at least one source table; determining at least one subset of change records of the set of change records where each subset of change records represents a distinct source partition of the at least one source table; determining a transaction, referred to as sub-transaction, per subset of change records of the at least one subset of change records, resulting in a set of one or more sub-transactions; controlling the target database system to execute the main transaction, the executing of the main transaction comprising concurrently executing the set of sub-transactions, wherein the executing of each sub-transaction of the set of sub-transactions comprises: concurrently adapting the data store and adapting the metadata store in accordance with the sub-transaction.

BRIEF DESCRIPTION OF THE DRAWINGS

In the following embodiments of the invention are explained in greater detail, by way of example only, making reference to the drawings in which.

DETAILED DESCRIPTION

Figure 1:
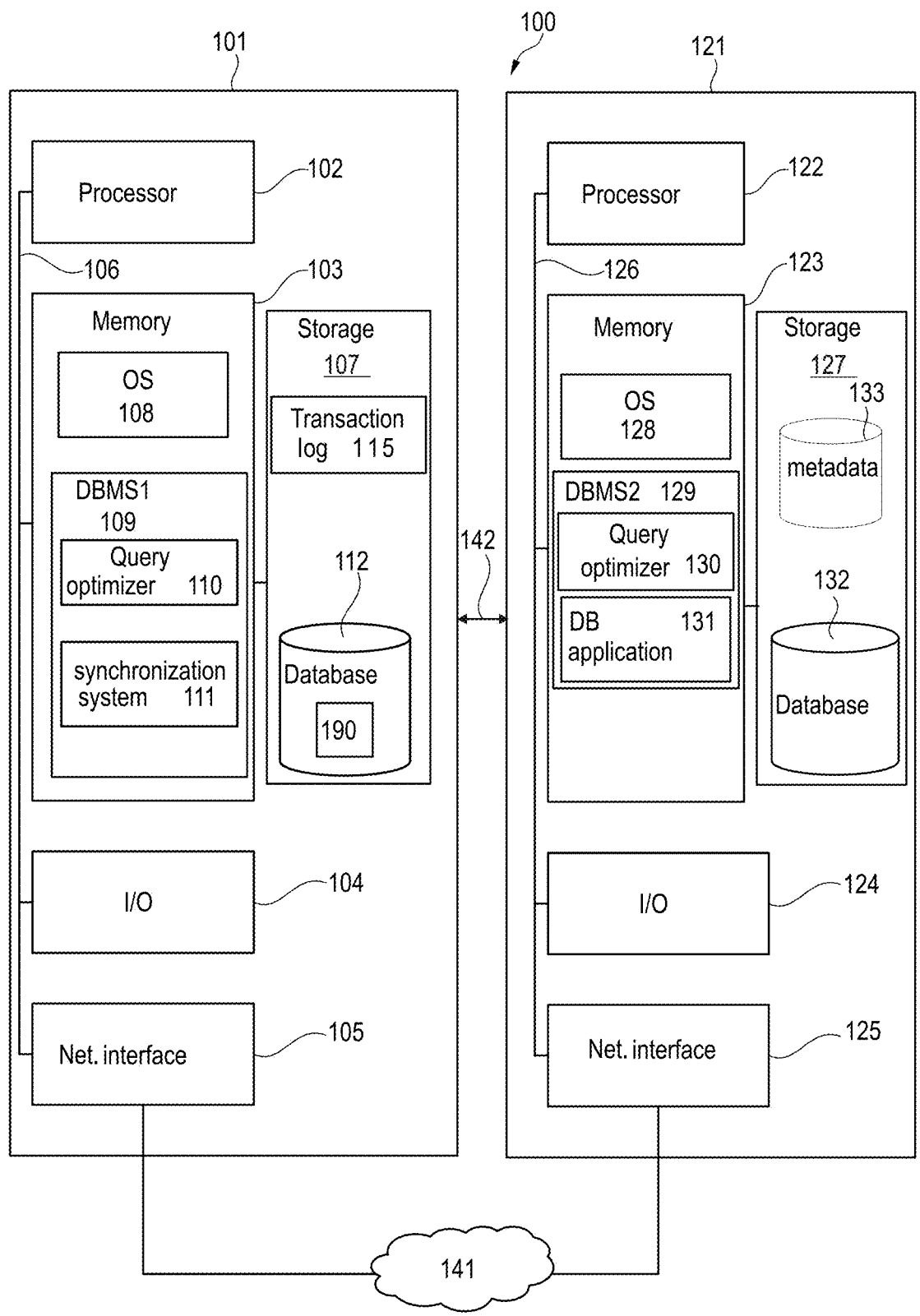
FIG. 1 illustrates a diagram of a data analysis system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may be advantageous. It may enable efficient utilization of parallel processing resources, such as processor cores and memory buffers, for data ingestion. It may achieve higher data ingestion throughputs. The deployment may be scalable, allowing ingestion speed to be directly tied to the amount of assigned processing resources. This scalability may facilitate control in cloud-based environments while meeting performance indicated by Service Level Agreements (SLAs). Additionally, it may require minimal implementation efforts e.g., to adjust a target table loader, and minimize the usage of processing and storage resources by avoiding the need to maintain multiple data copies or move table data multiple times. This method may advantageously be used in data ingestion tools for data lakehouse architectures.

The source database system may comprise at least one source table. The at least one source table may be one source table. Alternatively, the at least one source table may be multiple source tables. The term "table" may refer to a collection of related data held in a structured format. The table consists of attributes (also referred to as columns or fields), and data records (or rows). Each data record of the table may comprise values of the attributes and may represent a respective entity. For example, a student table may comprise attributes such as student ID, student age etc., wherein each data record of the table represents an entity being a specific student. The terms "data record" and "record" may interchangeably be used herein.

The target database system may comprise a data store and a metadata store. A store may, for example, be a repository for storing, managing, and retrieving data. The store may take various forms, including, for example, databases. The data store may be configured to comprise a synchronized copy of the at least one source table. For each source table of the at least one source table a corresponding target table may be created in the data store. The metadata store may be configured to comprise metadata descriptive of each target table in the data store. In one example, the metadata descriptive of a target table may be created in the metadata store upon creating the target table in the data store. For example, each target table in the data store may be provided with a corresponding target table metadata.

A partition of a table may be a data partition. Each partition may be stored separately. The partition may be a storage object such as a file. The storage objects of a table may be in different table spaces, in the same table space, or a combination of both. The source table may comprise partitions which are referred to as source partitions. The source table may, for example, be divided into the source partitions according to a first partition scheme. For example, the first partition scheme may enable to divide the source table into the source partitions according to values in one or more attributes of the source table. The target table which corresponds with the source table has partitions, referred to as target partitions. The target table may, for example, be divided into the target partitions according to a second partition scheme. For example, the second partition scheme may enable to divide the target table into the target partitions according to values in one or more attributes of the target table.

A transaction as used herein may be a database transaction. The transaction may represent a change in a database. The transaction may be a sequence of operations performed as a single logical unit of work within a database management system. The main transaction comprises the set of change records, where each change record of the set of change records may represent one or more data records of the source table. For example, the data records which are represented in the main transaction may be part of one or more source partitions of one or more source tables of the at least one source table. That is, if the at least one source table is one source table, said one or more source tables is that one source table. If the at least one source table is multiple source tables, the number of said one or more source tables may be higher than or equal to one. These one or more source partitions which are represented or involved in the main transaction may be named "transaction source partitions" and these one or more source tables represented in the main transaction may be named "transaction source tables". In one example, the transaction source partitions of each transaction source table in the main transaction may comprise a part of or all source partitions of the each transaction source table. The former may be advantageous in case an incremental change is applied on the transaction source table. The later may, for example, be advantageous in case of an initial or very first load of the transaction source table to the target database system.

The set of change records may be split or divided into at least one subset of change records, such that each subset of change records represents a distinct transaction source partition in the received main transaction. The set of sub-transactions may be defined or created so that each sub-transaction is defined per subset of change records of the at least one subset of change records. That is, each sub-transaction of the set of sub-transactions may be associated with a respective transaction source partition of the main transaction. For example, each sub-transaction of the set of sub-transactions may indicate data records of at least part of the respective transaction source partition.

The execution of the main transaction may comprise a concurrent execution of the set of sub-transactions e.g., the execution of the main transaction may comprise execution in parallel of the set of sub-transactions or the execution of the main transaction may comprise the execution of the set of sub-transactions in a manner at least partially overlapping in time. The execution of each sub-transaction of the set of sub-transactions may comprise a concurrent adaptation of the data store and adaptation of the metadata store in accordance with the sub-transaction. For example, the execution of each sub-transaction of the set of sub-transactions may comprise adapting in parallel the data store and the metadata store in accordance with the sub-transaction. For example, the adaptation of the data store and the adaptation of the metadata store in accordance with the sub-transaction may be performed in a manner at least partially overlapping in time.

During execution of the present method and before the completion of execution the main transaction, any received query against a target table, that is being adapted by one or more sub-transactions of the set of sub-transactions, may be executed against the last content of that target table that existed immediately before receiving the main transaction. The received query is a read access query. The present subject matter may enable to adapt the metadata in a way to reduce or avoid expensive data movements for enabling execution of queries.

According to one example, the first partition scheme is the second partition scheme, wherein each source partition is associated with a respective target partition. For example, for each source table in the source database system, the target table may be split into target partitions equal in number and structure as the source partitions of the source table. Using the same partitioning scheme may enable a simplified maintenance and processing of partitions in the source and target database systems.

According to one example, the second partition scheme is different from the first partition scheme, wherein each source partition may be associated with one or more target partitions. In this case, for example, the number of source partitions of each source table may be higher than or smaller than the number of target partitions of the target table associated with the source table. The partitioning schemes may be different to enable an efficient execution of read queries in the target database system and enable an efficient execution of write workloads on the source database system.

According to one example (first transaction execution example), the main transaction involves one or more transaction source tables of the at least one source table. That is, if the at least one source table is one source table, the one or more transaction source tables is that one source table. If the at least one source table is multiple source tables, the number of transaction source tables may be higher than or equal to one. The method further comprises: in response to receiving the main transaction, creating, in the metadata store, target table metadata associated with the one or more transaction source tables respectively. Each target table metadata may be descriptive of target partitions of a target table associated with the transaction source table. For example, each target table metadata may comprise links and/or information on links to target partitions of a target table associated with the transaction source table. For example, if for a given transaction source table, the corresponding target table exists in the data store before the reception of the main transaction, the target table metadata may initially indicate the target partitions of the existing target table before the target table metadata may be updated in a next step in this first transaction execution example. In this case, the creation of the target table metadata may, for example, be performed by using information on target partitions, which information is included in an existing target table metadata of the existing target table. If for a given transaction source table, the corresponding target table does not exist in the data store, the target table metadata may be created and filled with information on target partitions in a next step of this first transaction execution example. The metadata of the metadata store comprises the target table metadata. For each sub-transaction of the set of sub-transactions: one or more target partitions which are associated with the transaction source partition of the sub-transaction may be created in accordance with the second partition scheme. The creation of the target partition may comprise checking if the target partition is already created for a sub-transaction during execution of this first transaction execution example. And only if the target partition is not already created, it may be created. The adapting of the data store and the metadata store in accordance with each sub-transaction of the set of sub-transactions comprises: storing data of the transaction source partition of the each sub-transaction in the associated one or more target partitions and adapting or providing the target table metadata in accordance with the each sub-transaction.

For example, if the target table of each transaction source table is previously created before execution of the first transaction execution example, the created target partitions during the first transaction execution example may be added to target partitions of existing target table(s). The adaptation of the target table metadata may comprise inserting in the target table metadata information on the created target partitions in the first transaction execution example, information on data records of previous target partitions which are not replaced by data records of the created target partitions. The target table metadata may, for example, further comprise deletion information on the data records which have been replaced.

According to one example (second transaction execution example), the method further comprises: after performing the execution of the set of sub-transactions, creating in the data store a target table version per transaction source table, storing data descriptive of the created target partitions in the respective created target table versions, and controlling the target database system to use the target table metadata of each created target table version for access to partitions of the created target table version. The second transaction execution example may provide an example implementation of the first transaction execution example. The target table version may enable access to partitions of the target table that correspond with the version (e.g., version number) of the target table version. The commit of the main transaction may, for example, be performed before the controlling of the target database system to use the target table metadata of each created target table version for access to target partitions of the created target table version.

During execution of each of the first transaction execution example and the second transaction example, a query to access data in the target database system may be received. Thid query is a read access for data. The query may be executed on the last data of the target database system that existed immediately before receiving the main transaction. To better control this feature a versioning technique may be used as in the following example.

According to one example (third transaction execution example), the target database system is configured to use current versions in the data store and in the metadata store for processing queries. For example, each target table in the data store may be associated with at least one target table version including a current version and corresponding target table metadata may be associated with at least one version, including a current version. The target database system may be configured to check the version of each target table metadata and use it if the version is classified as being the current version. The target database system may be configured to check the version of each target table version and use it if the version is classified as being the current version. The method further comprises: marking each of the created target table metadata as an upcoming version and each of the created target table versions as an upcoming version, wherein the target database system is configured to use the upcoming versions as the current versions in response to a completion of the execution of the main transaction. The versioning may be advantageous in case the data store and metadata store comprise previous target table version(s) of the target table and previous versions of the target table metadata.

The third transaction execution example may provide an example implementation of the second transaction execution example.

The completion of the execution of the main transaction may, for example, be achieved at the point of time (commit time) immediately after performing a commit of the main transaction. The third transaction execution example may happen in the background to the current version which is accessible for potentially running queries that read current versions. This may isolate in-flight changes from parallel read access until commit time of the main transaction.

According to one example, the executing of the sub-transaction comprises performing a commit of the sub-transaction, wherein the executing of the main transaction comprises performing a commit of the main transaction in response to determining that the commit of all sub-transactions is performed. That is, the main transaction may be committed after the set of sub-transactions have been committed in the target database system.

According to one example, the main transaction represents a load request for loading one or more source partitions of the at least one source table, wherein the change records of the main transaction reference to or indicate data records of the one or more source partitions respectively. That is, the change records of the main transaction may be used to load data records of the transaction source partitions in the respective target partitions.

According to one example, each change record of the main transaction is descriptive of a change of one or more data records of a source partition of the at least one source table. The change record may, for example, comprise information defining one or more data records being changed and the value of the key column in the data record(s) being changed. In case of an update, the change record may further comprise the old and new values of all attributes of the changed one or more data records. In case of an insert, the change record may further comprise the one or more data records which are new data record(s) and therefore have no old values. In case of a delete change, the change record may further comprise the old data record(s).

According to one example, the method further comprises: in response to determining that the main transaction represents a load request for loading one or more source partitions of the at least one source table and that the first partition scheme is the same as the second partition scheme performing the execution of the sub-transaction partition-wise.

Processing tables partition-wise may offer significant advantages in performance and efficiency. It may allow for parallel processing of different partitions, significantly speeding up execution and data processing by making better use of available CPU cores and reducing I/O overhead. For example, by loading entire partitions into memory, the system may minimize disk access.

According to one example, the main transaction involves one or more source tables, referred to as transaction source tables, of the at least one source table, the metadata comprising target table metadata associated with the one or more transaction source tables respectively. The method further comprises: upon receiving the main transaction and before completion of the execution of the main transaction marking as deleted records in the target table metadata data records of the data store which are replaced by the data records represented with the change records.

According to one example, the target table metadata comprises links to data records which can be accessed by the target database system, wherein the marking comprises removing, from the metadata, links to the data records of the data store which are replaced by the data records represented with the change records.

For example, the metadata of a currently processed target table may be modified so that it does not contain links to the data files of the to-be-replaced partition anymore. This may hide these old partitions for future query processing without any additional runtime overheads. Alternatively, the data from these old partitions may be marked as deleted by attaching a special predicate to the partition data paths which is evaluated on query execution. For this implementation, a simple equality-based predicate may be used as filter which evaluates the partition ID information. In the incremental update mode, the previous partition is not completely replaced and, thus, individual rows may need to be marked as deleted. This can be achieved by implementing deletion predicates that is evaluated at query processing time (merge-on-read mode). Alternatively, a merge-on-write strategy may be implemented, which copies all rows from the previous partition version and skips all rows which are processed by the current transaction. The decision which strategy to use in this case may, for example, be made based on statistics over the data in the previous partition version and the current transaction to balance processing overheads with impacts on future query processing.

According to one example, the method further comprises: in response to determining that the main transaction represents an incremental update request performing the execution of the sub-transaction selectively on records of the source partition.

The incremental update request may refer to replication. The replication may be a technique to keep data on the target database system up to date. For that, after an initial copy of a source table via bulk load, modifications done on the source database system on any partition belonging to the source table may be copied to the target database system continuously. The time it may take from modifying the source table until the same state of data has been copied to the target database system may be called latency.

This example may enable granular control and precision, allowing for fine-grained updates to individual records without affecting other records. Additionally, this may be efficient for small updates, avoiding the overhead of loading entire partitions and conserving system resources like memory and CPU, making it suitable for frequent, small-scale changes.

According to one example, the determining of at least one subset of change records is performed using identifiers of the source partitions, wherein the identifiers are part of the main transaction or part of the metadata.

According to one example, the data analysis system is a data Lakehouse. The target database system may, for example, implement a data lakehouse architecture.

According to one example, the main transaction involves one source table of the at least one source table. That is, the main transaction involves one transaction source table.

According to one example, the at least one source table is multiple source tables, wherein the main transaction involves multiple transaction source tables of the at least one source table, wherein the concurrent execution of the sub-transactions is performed per transaction source table or for all transaction source tables. The present may enable cross-table transaction processing because it may implement a special tuning for each transaction source table that needs to be processed. It may guarantee single-table consistency guarantees, i.e., all changes may be atomic and consistent with respect to source database system transaction boundaries that are covered by existing bulk load and incremental update processes.

The data analysis system comprises the source database system and the target database system. The data analysis system may, for example, be a data warehousing system or master data management system or data lakehouse system. The data analysis system may enable data warehousing or master data management or another technique that uses a source and target database systems, wherein the target database system comprises a target database that is configured to receive/comprise a copy of a content of a corresponding source database of the source database system.

FIG. 1 is a block diagram for a data analysis system in accordance with an example of the present subject matter. The data analysis system 100 may, for example, comprise a data lakehouse. The data analysis system 100 comprises a source database system 101 connected to a target database system 121.

Source database system 101 includes processor 102, memory 103, I/O circuitry 104 and network interface 105 coupled together by bus 106.

Processor 102 may represent one or more processors (e.g., microprocessors). The memory 103 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

Memory 103 in combination with persistent storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like. The storage 107 may comprise a first database 112. The first database 112 may, for example, comprise one or more source tables 190.

Memory 103 may include one or more separate programs e.g., database management system DBMS1 109, each of which comprises an ordered listing of executable instructions for implementing logical functions, notably functions involved in embodiments of this invention. The software in memory 103 shall also typically include a suitable operating system (OS) 108. The OS 108 essentially controls the execution of other computer programs for implementing at least part of methods as described herein. DBMS1 109 comprises a data synchronization system 111 and a query optimizer 110. The data synchronization system 111 may comprise a log reader (not shown). The log reader may read log records (also referred to as log entries) of a transaction recovery log 115 of the source database system 101 and provide changed records to the target database system 121. The transaction recovery log 115 may be referred to as primary source transaction log. The usual content of a log record may comprise a timestamp, log record sequence number (LRSN) and attribute changes. More specifically, the log records in the transaction recovery log 115 may, for example, contain information defining (1) the table being changed, (2) the value of the key column in the row being changed, (3) the old and new values of all columns of the changed row, and (4) the transaction (unit of work) causing the change. By definition, an insert is a new data record and therefore has no old values. For delete changes, there is by definition no new data record, only an old data record. Thus, log records for inserted rows may contain only new column values while transaction log records for deleted rows may contain only old column values. Log records for updated rows may contain the new and old values of all row columns. The order of log records in the primary source transaction log 115 may reflect the order of change operations of the transactions and the order of transaction commit records may reflect the order in which transactions are completed. The type of row operations in log records can, for example, be delete, insert or update. The log reader may read log records from the recovery log, extract relevant modification or change information (inserts/updates/deletes targeting tables in replication). Extracted information may be transmitted (e.g., as a request for application of the change) to target database system 121 through a target table loader. The data synchronization system 111 may further comprise the target table loader. The update of table data in the second database 132 and metadata store 133 may be handled by the target table loader. The target table loader may provide a transactional interface for aggregating table change sets (inserts/updates/deletes) of individual table rows, converting them from the source to target database format, and atomically applying them to the target database system by updating the table data and corresponding metadata. The query optimizer 110 may be configured for generating or defining query plans for executing queries e.g., on first database 112. The data synchronization system 111 may in another example be a standalone component which is configured to connect and access to the source database system 101 and the target database system 121.

Target database system 121 includes processor 122, memory 123, I/O circuitry 124 and network interface 125 coupled together by bus 126.

Processor 122 may represent one or more processors (e.g., microprocessors). The memory 123 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

Memory 123 in combination with persistent storage device 127 may be used for local data and instruction storage. Storage device 127 includes one or more persistent storage devices and media controlled by I/O circuitry 124. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs e.g., database management system DBMS2 129, each of which comprises an ordered listing of executable instructions for implementing logical functions, notably functions involved in embodiments of this invention. The software in memory 123 shall also typically include a suitable OS 128. The OS 128 essentially controls the execution of other computer programs for implementing at least part of methods as described herein. DBMS2 129 comprises a DB application 131 and a query optimizer 130. The DB application 131 may be configured for processing data stored in storage device 127. The query optimizer 130 may be configured for generating or defining query plans for executing queries using second database 132 and metadata store 133. The database second 132 may comprise target tables and the metadata store 133 may comprise target table metadata descriptive of the target tables. The target tables may be associated with the source tables 190 in the first database 112.

Source database system 101 and target database system 121 may be independent computer hardware platforms communicating through a high-speed connection 142 or a network 141 via network interfaces 105, 125. The network 141 may, for example, comprise a local area network (LAN), a general wide area network (WAN), and/or a public network (e.g., the Internet). Each of the source and target database systems 101 and 121 may be responsible for managing its own copies of the data.

Although shown in FIG. 1 as separate systems, the source and target database systems may belong to a single system e.g., sharing a same memory and processor hardware, while each of the source and target database systems is associated with a respective DBMS and datasets e.g., the two DBMSs may be stored in the shared memory. In another example, the two database management systems DBMS1 and DBMS2 may form part of a single DBMS that enables communications and method performed by DBMS1 and DBMS2 as described herein. The first and second datasets may be stored on a same storage or on separate storages.

Figure 2:
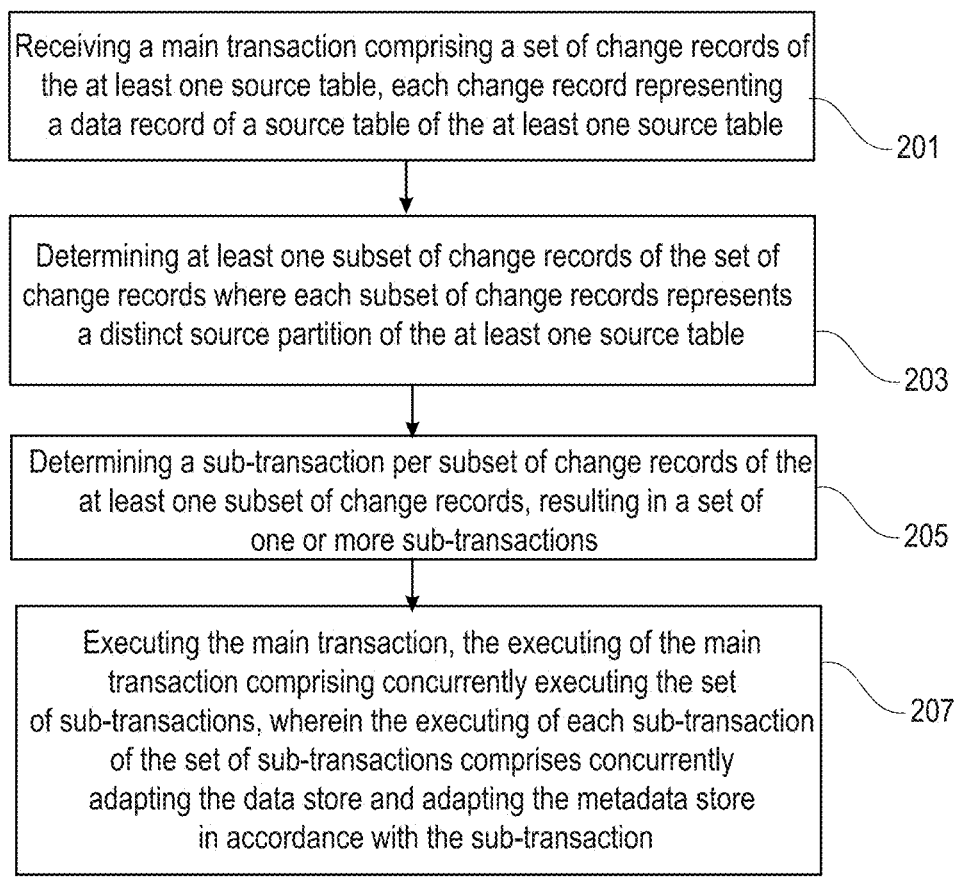
FIG. 2 is a flowchart of a synchronization method in accordance with an example of the present subject matter.

FIG. 2 is a flowchart of a method for data synchronization in accordance with an example of the present subject matter. For the purpose of explanation, the method described in FIG. 2 may be implemented in the system illustrated in FIG. 1 or FIG. 3, but is not limited to this implementation. The method of FIG. 2 may for example be used for synchronization of source tables in the source database system of FIG. 1 (or FIG. 3) with corresponding target tables in the target database system of FIG. 1 (resp FIG. 3).

A main transaction may be received in step 201. The main transaction comprises a set of change records of the at least one source table. Each change record represents at least one data record of a source table of the at least one source table (e.g., 190 or 303).

A least one subset of change records of the set of change records may be determined in step 203. Each subset of change records is determined such that it represents a distinct source partition of the at least one source table.

A sub-transaction may be determined per subset of change records of the at least one subset of change records in step 205. This may result in a set of one or more sub-transactions.

The main transaction may be executed in step 207 by at least concurrently executing the set of sub-transactions, wherein the execution of each sub-transaction of the set of sub-transactions comprises: concurrently adapting the data store (e.g., 132 or 325) and adapting the metadata store (e.g., 133 or 322) in accordance with the sub-transaction.

Figure 3:
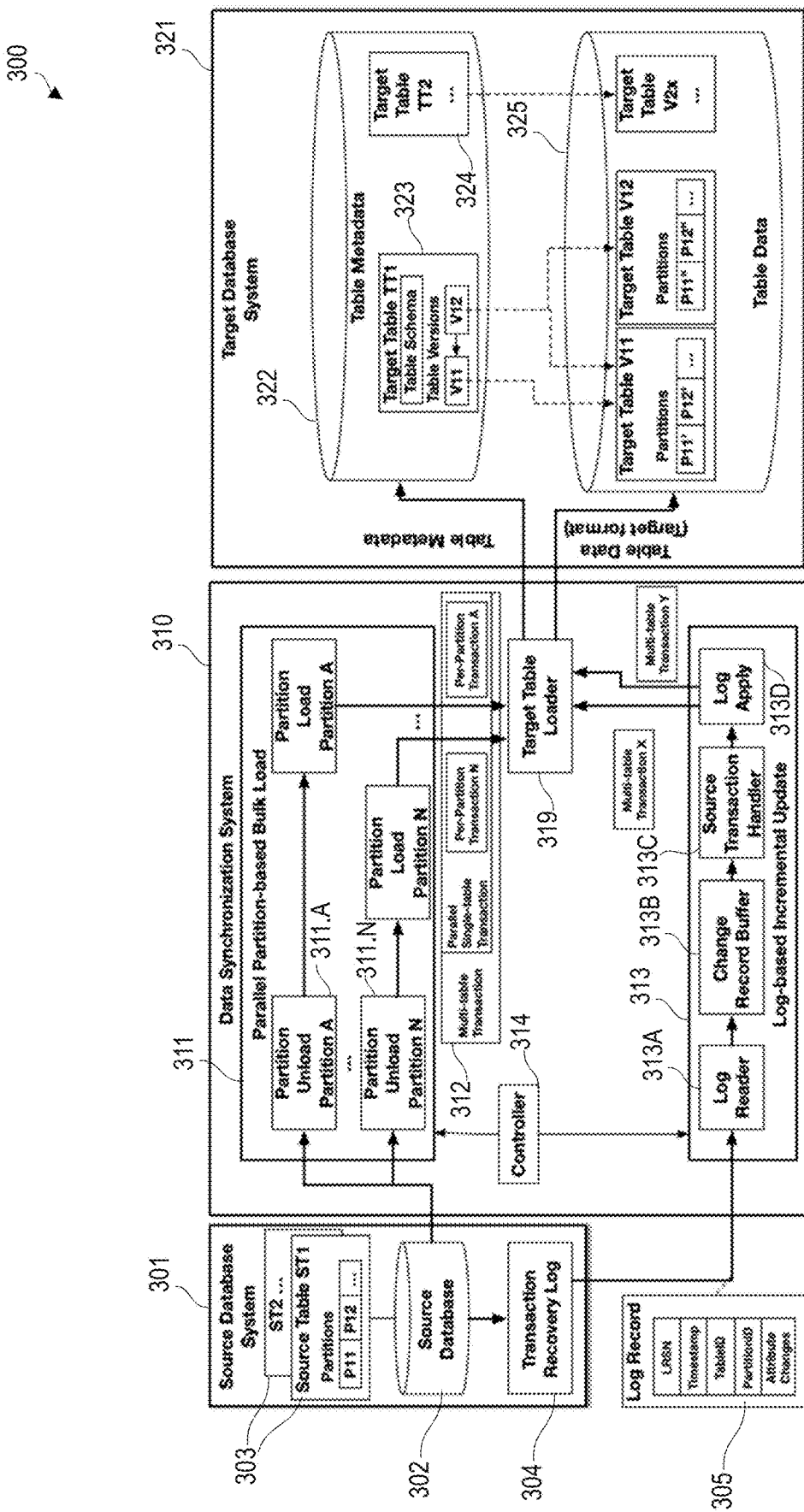
FIG. 3 is a diagram of a data analysis system illustrating a method for synchronizing data in accordance with an example of the present subject matter.

FIG. 3 is a diagram of a data analysis system 300 illustrating a method for synchronizing data in accordance with an example of the present subject matter.

The data analysis system 300 comprises a source database system 301, a data synchronization system 310 and a target database system 321.

The source database system 301 comprises a source database 302. The source database 302 comprises source tables 303. As shown, the source tables 303 may comprise source table ST1. The source table ST1 comprises source partitions such as P11 and P12.

The source database system 301 comprises a transaction recovery log 304. The entries (or change records) of the transaction recovery log 304 describe changes to rows or records of the source tables 303 at the source database system 301. FIG. 3 shows an example content of a change record 305. The change record 305 may comprise a timestamp, log record sequence number (LRSN) and attribute changes. More specifically, the change records in the transaction recovery log 304 may, for example, contain information defining (1) the table being changed, (2) the value of the distribution key in the row being changed, (3) the old and new values of all columns of the changed row, and (4) the transaction (unit of work) causing the change. By definition, an insert is a new data record and therefore has no old values. For delete changes, there is by definition no new data record, only an old data record. Thus, transaction change records for inserted rows may contain only new column values while transaction change records for deleted rows may contain only old column values. Transaction change records for updated rows may contain the new and old values of all row columns. The order of change records in the transaction recovery log 304 may reflect the order of change operations of the transactions. The type of row operations in transaction change records can, for example, be delete, insert or update.

The target database system 321 comprises a metadata store 322 and a data store 325. The data store 325 comprises target tables such as TT1 and TT2. Specifically, the data store 325 may comprise different versions of the same target table such as the version V11 and V12 of the target table TT1. However, only one version of these versions may be classified or defined as being current version, wherein queries may be executed against the current version. Each target table of the target database system 321 has a corresponding source table of the source database system 301. Each target table of the target database system 321 is configured to comprise a copy of the content of the corresponding source table. For example, the target table TT1 corresponds with the source table ST1 and the target table TT2 corresponds with source table ST2 etc. The metadata store 322 comprises target table metadata per target table in the data store 325. Following the example of FIG. 3, the metadata store 322 comprises target table metadata 323 for target table TT1 and target table metadata 324 for target table TT2. Also, the metadata store 322 may comprise multiple versions of each target table metadata, wherein one version is classified as current version. The target table metadata may, for example, allow to understand the organization of data in a corresponding specific target table and how to access it. The target table metadata may, for example, comprise the locations (paths) of the data file(s) of target partitions of the specific target table in the data store 325. This may enable to locate and retrieve the data efficiently. The target table metadata may, for example, comprise versions of the specific target table. This may enable time travel queries and consistent read operations.

The data synchronization system 310 may be configured to synchronize the content of the source tables 303 with corresponding target tables in the target database system 321. The synchronization may be performed using a load program 311 and a replication program 313. The switching between the two programs 311 and 313 may be performed using a controller 314 of the data synchronization system 310.

The load program 311 may enable a bulk loading of a whole copy of a source table to a corresponding target table. As indicated in FIG. 2, the load program 311 may be implemented (311.A through 311.N) per source partition of the source table to be bulk loaded. This may be performed through a multi-table transaction 312 comprising a parallel single table transaction per source table to be bulk loaded. The parallel single table transaction comprises one sub-transaction per partition of the source table. The sub-transactions may be provided to a target table loader 319 of the data synchronization system 310 so that the target table loader may update concurrently the metadata store 322 and the data store 325 according to the sub-transactions.

The replication program 313 may be implemented by components including a log reader 313A, a change record buffer 313B, a source transaction handler 313C and a log apply component 313D. These components may be described as follows.

The present subject matter may provide an efficient method for ingesting large chunks of source table data into the target database. The present subject matter may process specially crafted parallel-single-table transactions that may impact how data and metadata is written to the target database system 321. The present method may process transactions to exploit context information from the data synchronization system 310 about large batches of source table changes which logically operate on the same set of source tables but can be processed in parallel because they physically refer to disjoint sets of source table rows. This transaction type may be embedded in multi-table transaction processing flows which may guarantee consistency across multiple tables. The independent batches of change records may be written to the target table data store 325 using the default process of the target table loader 319 with slightly modified target definitions. The commit processing may also be enhanced so that the parallel-processed table batches are joined to a single unified table version which may guarantee atomic update semantics to external target database client applications. The method may be provided in a way that the necessary operations are mainly performed on the table metadata level which may avoid expensive additional data movements. This improvement can be implemented for both data synchronization methods in the context of Data Gate, i.e., bulk loading as well as incremental update processing. While batching of records stemming from the bulk load path is implicitly given by the architecture of the source table processing flow which operates on partition-level, the transactions which are processed by the incremental update process may span arbitrary partitions of the source table. Therefore, a source transaction handler 313C may be employed as additional component, which operates on the buffer 313B of incoming change records and splits change record data to independent chunks while respecting source transaction boundaries. This processing may be combined with existing optimizations for this flow, like change compensation. As optional additional enhancement, context information about the active data synchronization operation may be provided as input to the improved parallel transaction processing method, i.e., whether the target table loader transaction was called from the bulk load processing or from the incremental update path. This additional hint may be exploited by the target table loader 319 for optimizing the resulting data structures in the target database for the bulk load case. Because bulk load operates on partition level, which is defined by the source database table layout, e.g., for refreshing a complete partition, rotating partitions, etc., any existing data for affected partitions in the target database may be replaced by the load operation. That is, large chunks of data may be deleted with simple metadata operations so that subsequent queries for the refreshed table version can be executed more efficiently. The incremental update path may not have this property because it only affects subsets of the source table rows that belong to a single partition. In this case, the processing of delete operations may not replace entire partitions.

Upon starting a target table loader transaction, the process may indicate that this happens from a bulk load context which enables special processing of partition data. This may be implemented by a special transaction parameter. Alternative implementations may derive this context from the existing transaction parameters, e.g., by special naming patterns of the processed table. The load process may need to inject partition identification information into the data stream that flows from the source database system 301 to the target table loader 319. This may be implemented by using a special internal partition ID column that is not part of the source table schema but becomes part of the target table schema. In this case, the partition ID of a to-be-loaded partition can be injected as literal constant. Alternative implementations may use partition data identification information in the table metadata, e.g., by embedding special properties in the files that are stored in the target table metadata store 322.

The incremental data replication may utilize the parallel processing capabilities. It may divide the batches of to-be-replicated change records into independent partitions per table. This may be implemented by enhancing the source transaction handler 313C which may also process the change records for change compensation. Once this is accomplished, the parallel single table transaction may be started like in the bulk load case but passing the incremental update context instead of the bulk load context on transaction start. In both cases, the incremental update process may need to provide information about the modified partitions to the target table loader 319. This may be implemented on a per-row basis of all change records that are processed, e.g., by obtaining a partition ID from the source database system context and injecting this value in the change record stream that is transformed from the source database system format to the target database system format.

Hence, data residing in source tables of the source database system 301 may be mirrored by the data synchronization system 310 to the target database system 321 which implements a data lakehouse architecture, e.g., it separates handling of data and metadata. The data mirroring may be performed with two strategies which are properly synchronized by the controller 314: bulk loading for mass unload/load of entire table partitions and incremental update for reading changes applied to source tables from the transaction recovery log and applying them to the target database tables. The update of table data and metadata may be handled by the target table loader 319 which provides a transactional interface for aggregating table change sets (inserts/updates/deletes) of individual table rows, converting them from the source to target database format, and atomically applying them to the target database system by updating the table data and corresponding metadata. At the target database 325, the actual data is stored, for example, in parquet-formatted files in a data storage service whereas the metadata is separately maintained in, for example, HIVE metastore 322 which provides a relational access model to target database clients via, for example, the iceberg table format. The data model at the target database may maintain multiple versions of the data of the tables which are linked to allow time-travel queries.

Figure 4A:
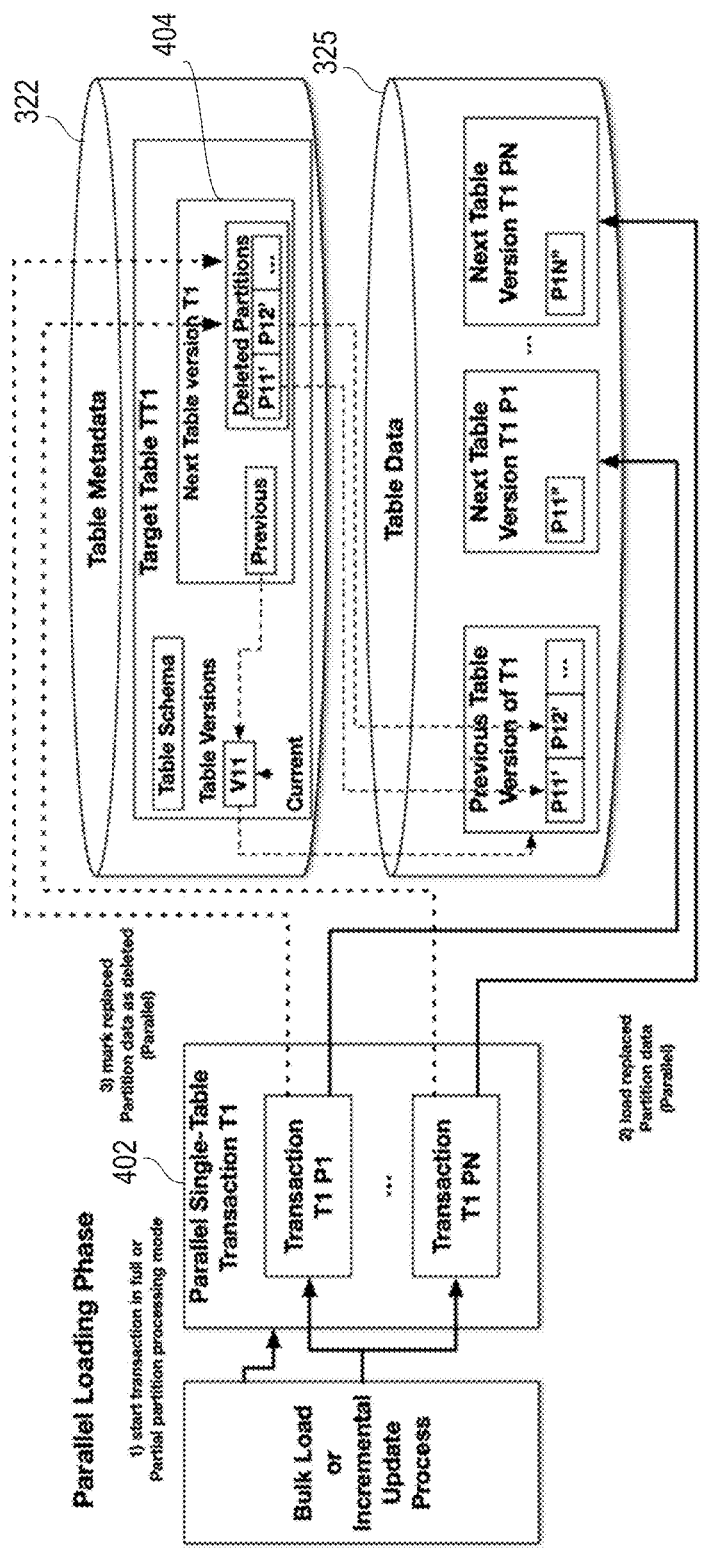
FIG. 4A is a diagram illustrating an example content of the target database system of FIG. 3 after performing synchronization in accordance with an example of the present subject matter.
Figure 4B:
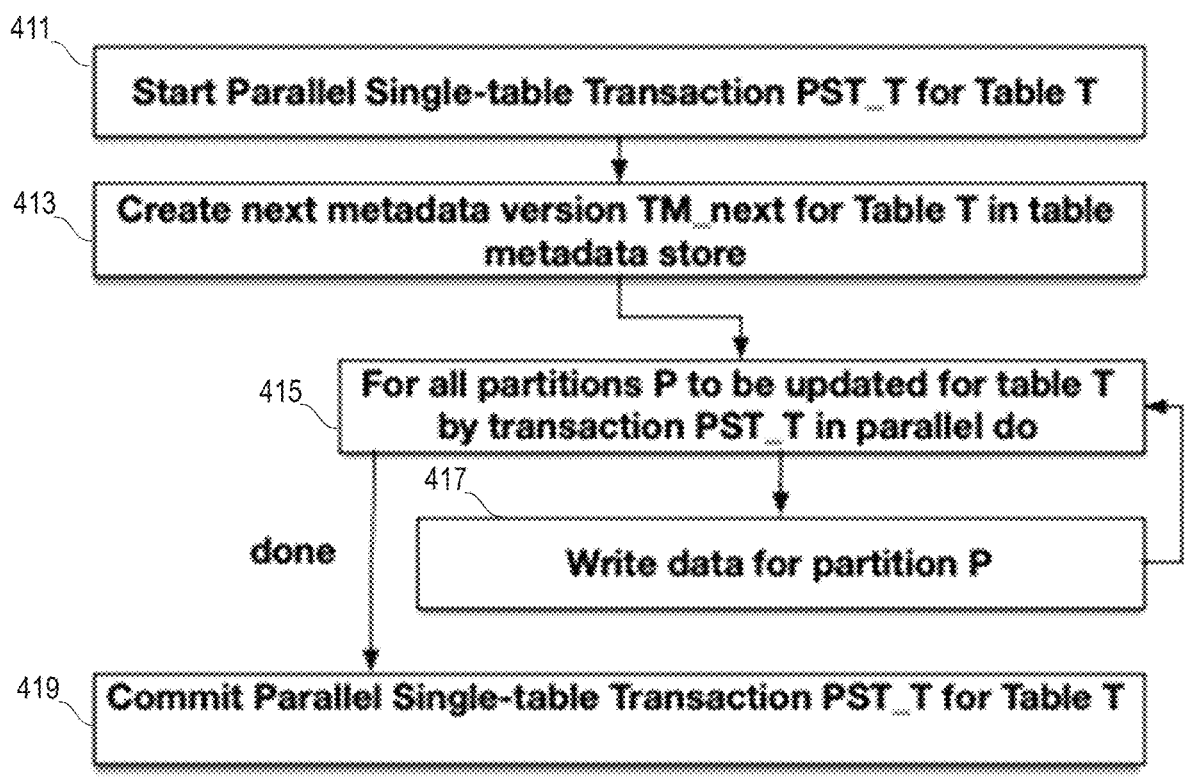
FIGS. 4B-D are flowcharts of methods for updating the target database system as shown in FIG. 4A.
Figure 4C:
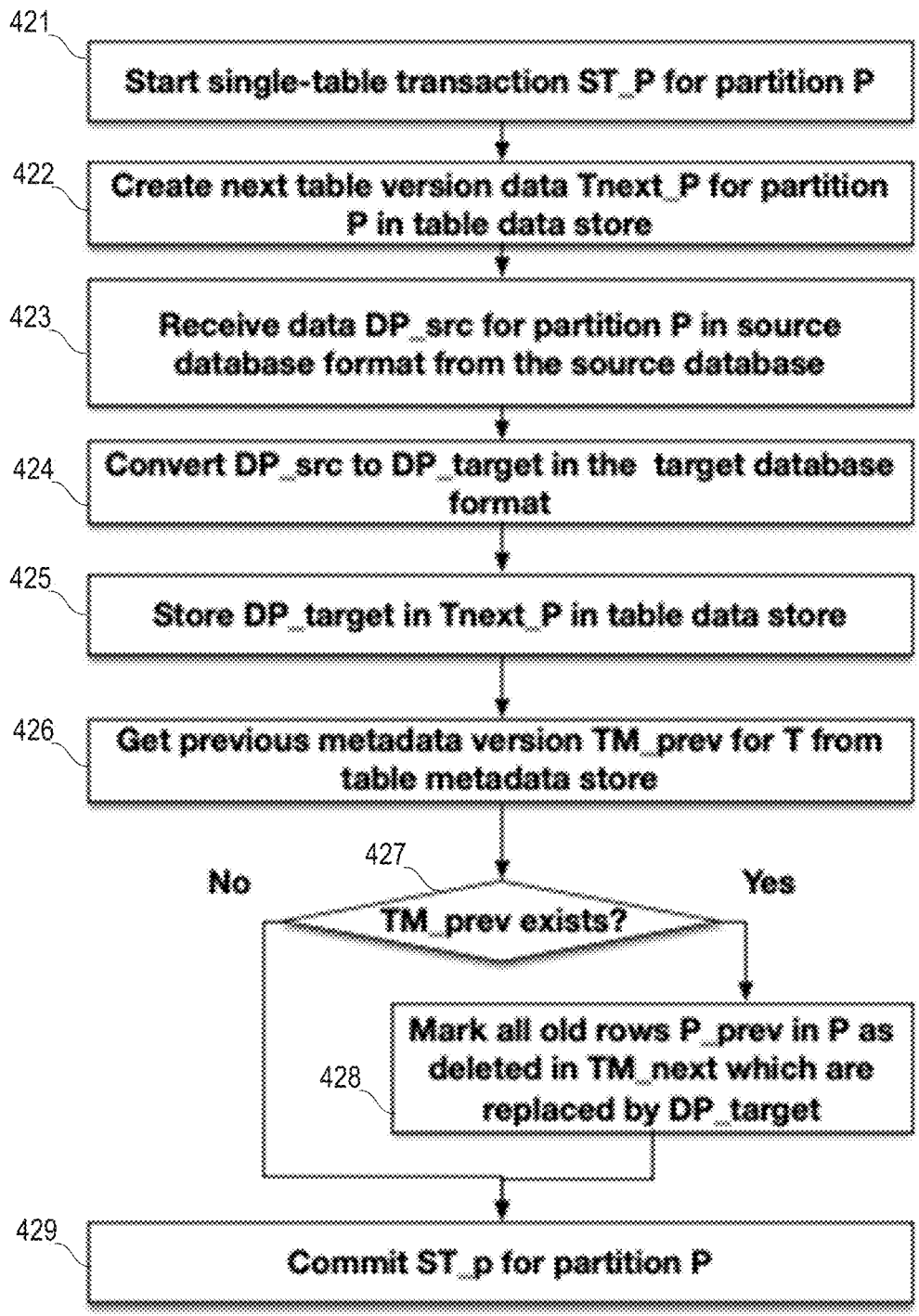
Figure 4D:
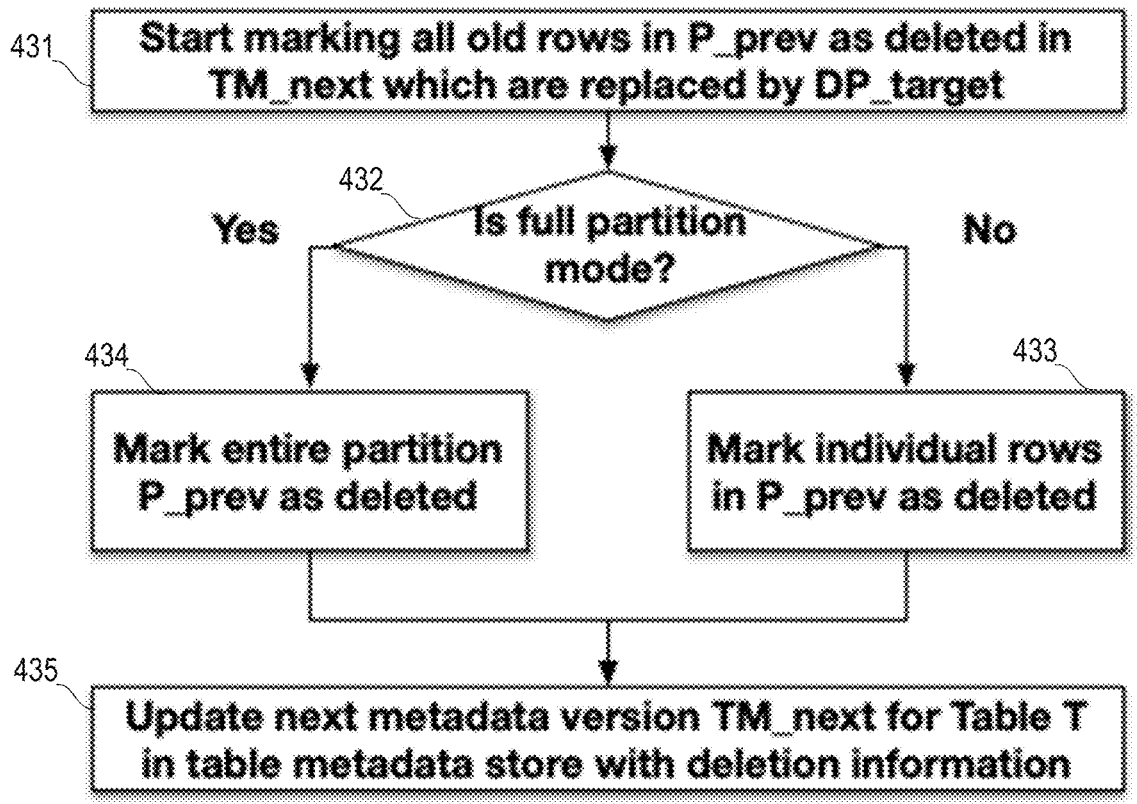

FIG. 4A is a diagram illustrating an example content of the target database system 321 of FIG. 3 after performing synchronisation in accordance with an example of the present subject matter. FIGS. 4B-D are flowcharts of methods for updating the target database system 321 that may lead to the content as shown in FIG. 4A. FIGS. 4B-D may provide nay example implementation of the third transaction execution example. As indicated in FIG. 4A, the bulk load or incremental process may start a parallel transaction 402 and passes context information whether it runs in a full partition processing mode (for bulk load case) or partial partition processing mode (incremental update case). Subsequently, parallel streams per table partitions are processed which are propagated to the data store 325, i.e., new record values will be stored and propagated to the metadata store 322 when information about outdated data from previous partitions need to be maintained. Only a single source table T1 is illustrated which should be loaded from the source database system to the target database system. But there may be multiple tables that are handled concurrently. The source table T1 comprises a number N of partitions, P1 through PN. The synchronization of the content of the source table T1 with the corresponding target table TT1 in the target database system 321 may be performed using a parallel single table transaction 402 which is defined by a sub-transaction per partition of the source table T1. As shown in FIG. 4B, the parallel single table transaction 402 may start in step 411. The next metadata version TM_next 404 for the target table TT1 may be created in step 413. The N sub-transactions may be processed in parallel in steps 415 and 417 in order to write data for each partition as indicated by arrows in FIG. 4A between sub-transactions and corresponding partitions in the target database system. A commit of the parallel single table transaction 402 may be performed in step 419. The method of FIG. 4B may, for example, happen in the background to the current table version which is accessible for potentially running queries that read previous data versions. This may isolate in-flight changes from parallel read access until commit time.

An example implementation of steps 415 and 417 may be described with reference to FIG. 4C. FIG. 4C is a flowchart of a method for executing a sub-transaction for specific partition P in accordance with an example of the present subject matter. The sub-transaction may start in step 421. A next table version of the partition P may be created in step 422. Data of the partition P may be received in step 423 from the source database. The received data of the partition P may be in source database format. The received data may be converted from the source database format to the target database format in step 424. The data in the target database format may be stored in step 425 in the created next version of the partition P. The previous version of the target table metadata of the target table may be get in step 426. It may be determined in step 427 whether the previous version of the target table metadata exists. If not, a commit of the sub-transaction may be performed in step 429; otherwise, all old rows or records in the partition P may be marked in step 428 as deleted in the next metadata version 404. An example implementation of step 428 may be described with reference to FIG. 4D. A start of the marking of the rows which are replaced by the received data may be performed in step 431. It may be determined in step 432 whether the sub-transaction is defined for bulk load transaction (that is it is full partition mode or nor). If so, the entire partition may be marked as deleted in step 434; otherwise, individual rows of the partition may be marked in step 433. In step 435, the next metadata version 404 may be updated with deletion information.

Figure 5A:
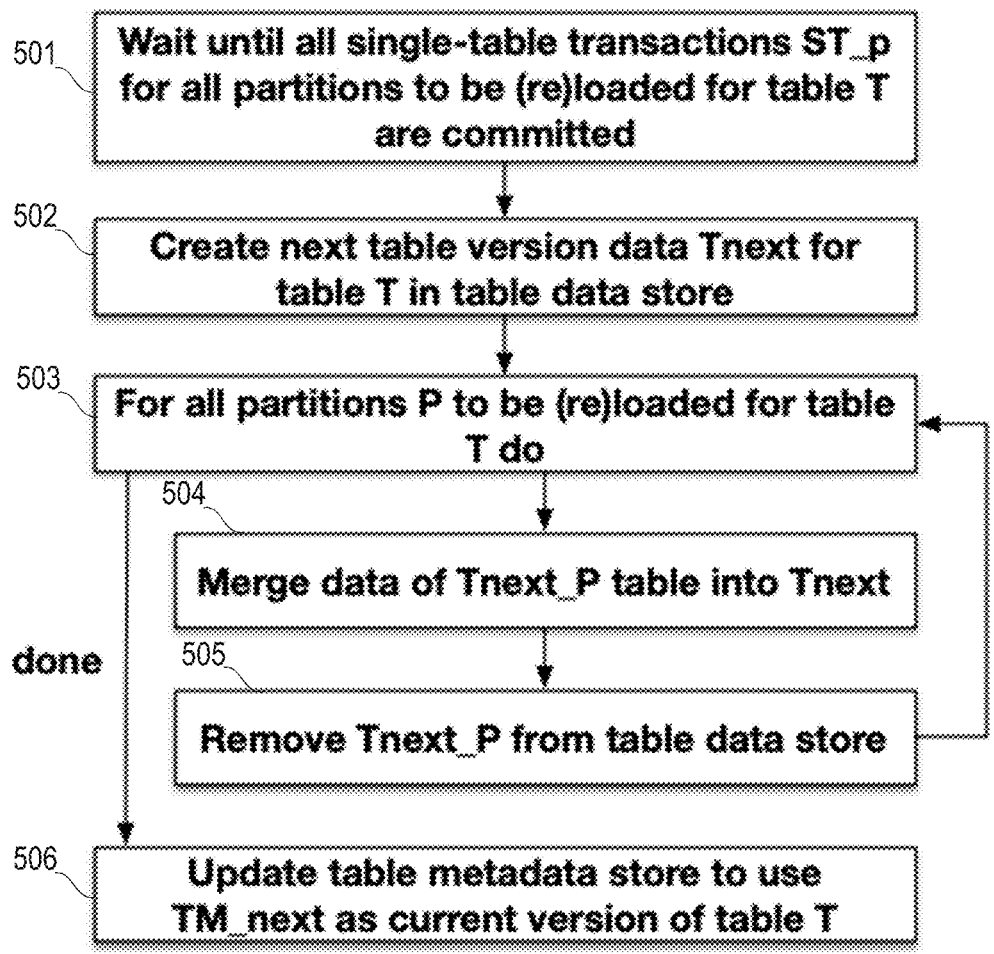
FIG. 5A is a flowchart of a method for performing a commit of a main transaction in accordance with an example of the present subject matter.

FIG. 5A is a flowchart of a method for performing a commit of a main transaction in accordance with an example of the present subject matter. For the purpose of explanation, the method in FIG. 5A may be described with reference to the content of the target database system as shown in FIG. 4A and further detailed in FIG. 5B.

Figure 5B:
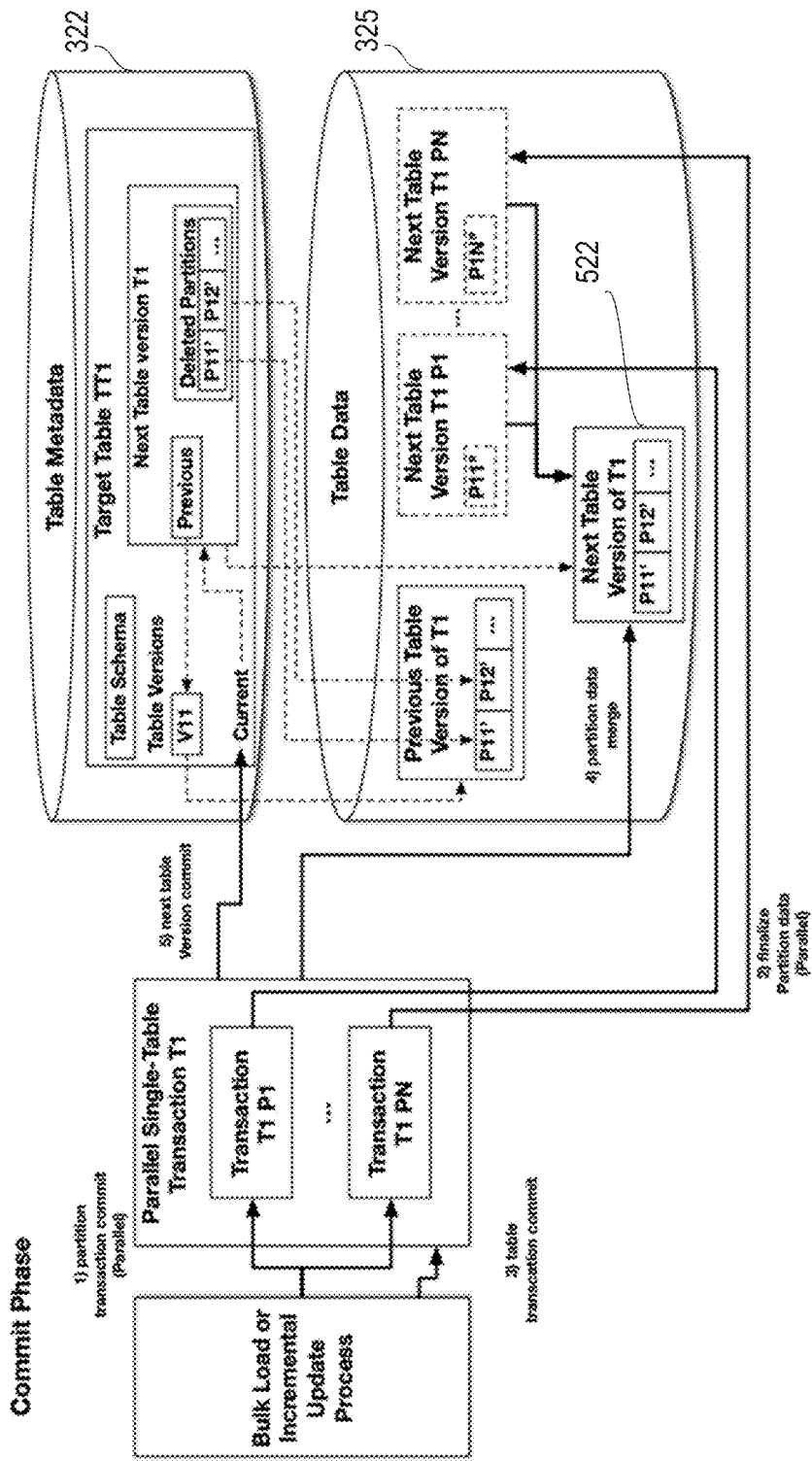
FIG. 5B is a diagram illustrating an example content of the target database system of FIG. 3 after performing synchronization and commit in accordance with an example of the present subject matter.

One may wait in step 501 until all the N sub-transactions of the main transaction 402 are committed. A next table version 522 (as shown in FIG. 5B) of the target table may be created in step 502. For each (503) partition of the N partitions to be loaded in the target table, the next table version of the partition may be merged in step 504 in the next table version of the target table 522 and may thereafter be deleted in step 505. The table metadata store may be updated in step 506 to use the next metadata version TM_next 404 as the current version for the target table TT1.

Hence, FIG. 5A and FIG. 5B illustrate the commit process when the parallel table transaction has applied all changes and needs to make the new table version available for future queries. The first step may be a synchronization with the parallel partition-level operations which guarantees that all partition data is correctly reflected in the target database data and metadata. Second, the metadata for the entire table version which has been processed in parallel may need to be created. It may have to be updated with all paths to the partition-level data files which, up to this point in time, are still stored in temporary partition-specific tables. This actually may implement a merge operation which may not need to involve any data movement because it just updates references to the previously processed data. Once all partition-level changes have been merged to a unified table version, the temporary partition-table versions can be removed. Once the next metadata version of the table is completed, it can be finally marked as the current one by adding it to the list of available table versions in the target table metadata and updating the "current" reference (shown in FIG. 5B) which may be used as entry point for subsequent query processing.

The present subject matter may comprise the following clauses.

Clause 1. A method for data synchronization in a data analysis system, the data analysis system comprising a source database system and a target database system, the source database system comprising at least one source table, wherein the at least one source table comprises partitions, referred to as source partitions, the target database system comprising a data store and a metadata store, the data store being configured to comprise at least one target table corresponding to the at least one source table respectively, the metadata store being configured to comprise metadata descriptive of the at least one target table; the method comprising: receiving a transaction, referred to as main transaction, the main transaction comprising a set of change records of the at least one source table, each change record representing a data record of a source table of the at least one source table; determining at least one subset of change records of the set of change records where each subset of change records represents a distinct source partition of the at least one source table; determining a transaction, referred to as sub-transaction, per subset of change records of the at least one subset of change records, resulting in a set of one or more sub-transactions; executing the main transaction, the executing of the main transaction comprising concurrently executing the set of sub-transactions, wherein the executing of each sub-transaction of the set of sub-transactions comprises: concurrently adapting the data store and adapting the metadata store in accordance with the sub-transaction.

Clause 2. The method of cluse 1, wherein the at least one source table is partitioned into the source partitions in accordance with a first partition scheme, the target database system being configured to partition the target table into target partitions in accordance with a second partition scheme, wherein the first partition scheme is the same or different from the second partition scheme, wherein in case the second partition scheme is the first partition scheme, the source partition is associated with a respective target partition, wherein in case the second partition scheme is different from the first partition scheme, the source partition is associated with respective one or more target partitions.

Clause 3. The method of clause 1 or 2, the main transaction involving one or more source tables, referred to as transaction source tables, of the at least one source table, wherein the main transaction can involve more than one source table in case the at least one source table is multiple source tables, the method further comprising: in response to receiving the main transaction, creating, in the metadata store, target table metadata associated with the one or more transaction source tables respectively, each target table metadata being descriptive of target partitions of a target table associated with the transaction source table, the metadata comprising the target table metadata; for each sub-transaction of the set of sub-transactions: creating, in the data store, if not yet created, one or more target partitions which are associated with the source partition of the sub-transaction in accordance with a partition scheme of the target database system; wherein the adapting of the data store and the metadata store in accordance with the sub-transaction comprises: storing data of the source partition of the sub-transaction in the associated one or more target partitions and adapting the target table metadata in accordance with the sub-transaction.

Clause 4. The method of clause 3, further comprising: after performing the execution of the set of sub-transactions, creating in the data store a target table version per transaction source table; storing data descriptive of the created target partitions in the respective created target table versions; controlling the target database system to use the target table metadata of each created target table version for access to target partitions of the created target table version.

Clause 5. The method of clause 4, the target database system being configured to use current versions in the data store and in the metadata store for processing queries, the method further comprising: marking each of the created target table metadata as an upcoming version and each of the created target table versions as an upcoming version, wherein the target database system is configured to use the upcoming versions as the current versions in response to a completion of the execution of the main transaction.

Clause 6. The method of any of the preceding clauses 1 to 5, the executing of the sub-transaction comprising performing a commit of the sub-transaction, wherein the executing of the main transaction comprises performing a commit of the main transaction in response to determining that the commit of all sub-transactions is performed.

Clause 7. The method of any of the preceding clauses 1 to 6, the main transaction representing a load request for loading one or more source partitions of the at least one source table, wherein the change records of the main transaction reference to or indicate data records of the one or more source partitions respectively.

Clause 8. The method of any of the preceding clauses 1 to 6, wherein each change record of the main transaction is descriptive of a change of one or more data records of a source partition of the at least one source table.

Clause 9. The method of any of the preceding clauses 1 to 7, further comprising: in response to determining that the main transaction represents a load request for loading one or more source partitions of the at least one source table and that the first partition scheme is the same as the second partition scheme performing the execution of the sub-transaction partition-wise.

Clause 10. The method of any of the preceding clauses 1 to 9, the main transaction involving one or more source tables, referred to as transaction source tables, of the at least one source table, the metadata comprising target table metadata associated with the one or more transaction source tables respectively, each target table metadata being descriptive of target partitions of a target table associated with the transaction source table, the method further comprising: upon receiving the main transaction and before completion of the execution of the main transaction marking in the target table metadata data records of the data store which are replaced by the data records represented with the change records as deleted records.

Clause 11. The method of clause 10, the target table metadata comprising links to partitions which can be accessed by the target database system, the marking comprising removing from the target table metadata links to the partitions of the data store which are replaced by the data records represented with the change records.

Clause 12. The method of any of the preceding clauses 1 to 6 and 8 to 11, further comprising: in response to determining that the main transaction represents an incremental update request performing the execution of the sub-transaction selectively on records of the source partition.

Clause 13. The method of claims 1 to 12, wherein the determining of at least one subset of change records is performed using identifiers of the source partitions, wherein the identifiers are part of the main transaction or part of the metadata.

Clause 14. The method of any of the preceding clauses 1 to 13, the data analysis system being a data Lakehouse.

Clause 15. The method of any of the preceding clauses 1 to 14, the main transaction involving one source table of the at least one source table.

Clause 16. The method of any of the preceding clauses 1 to 15, the at least one source table being multiple source tables, the main transaction involving multiple source tables of the at least one source table, wherein the concurrent execution of the sub-transactions is performed per involved source table or for all involved source tables.

Computing environment 800 contains an example of an environment for the execution of at least some of the computer code involved in performing the inventive methods, such as code 900 for synchronization of data in a data analysis system comprising a data store and a metadata store. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Figure 6:
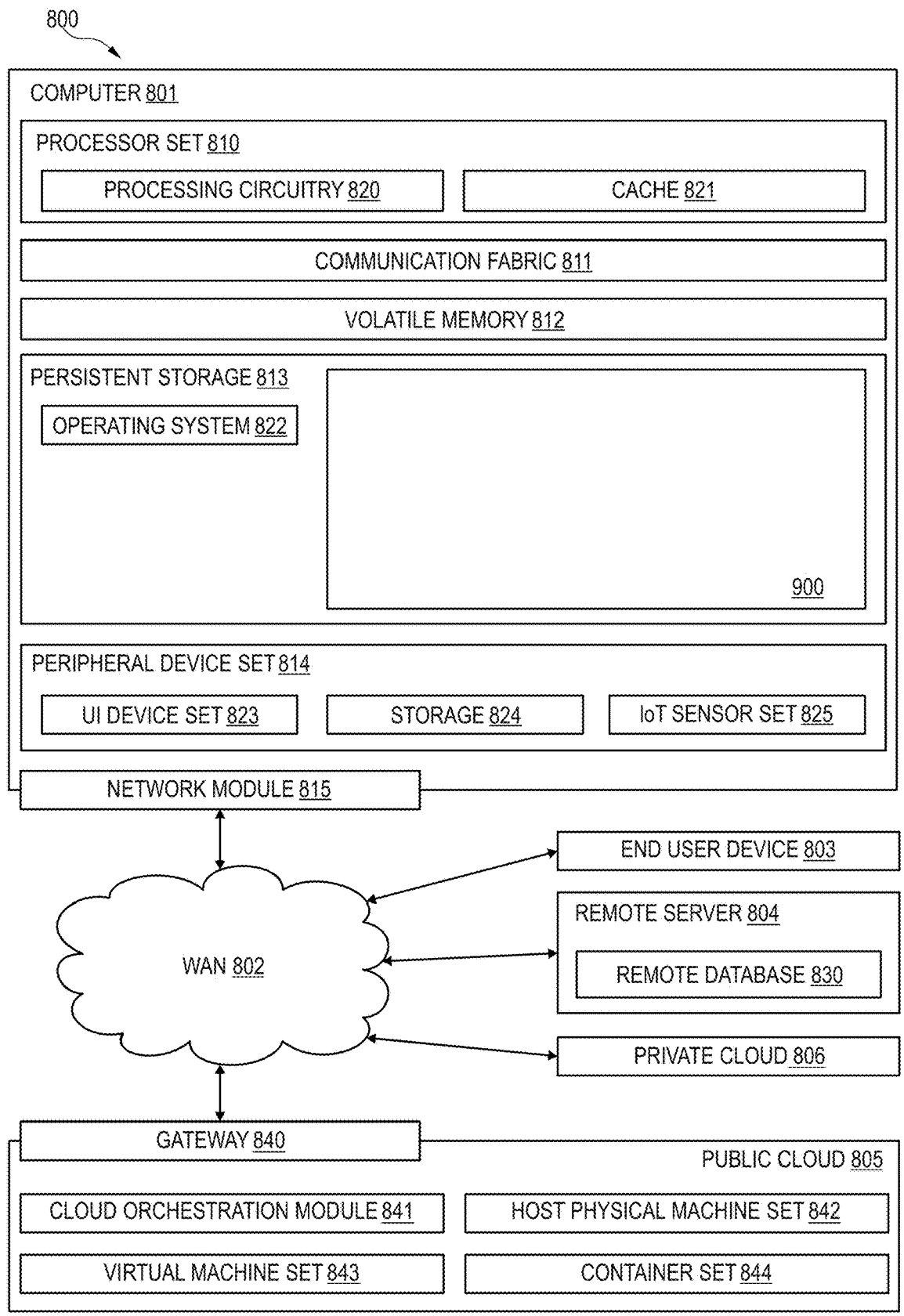
FIG. 6 is a computing environment according to an example of the present subject matter.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 6. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

CLOUD COMPUTING SERVICES AND/OR MICROSERVICES (not separately shown in FIG. 6): private and public clouds are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The invention claimed is:

1. A method for data synchronization in a data analysis system, the data analysis system comprising a source database system and a target database system, the source database system comprising at least one source table, wherein the at least one source table comprises partitions, referred to as source partitions, the target database system comprising a data store and a metadata store, the data store being configured to comprise at least one target table corresponding to the at least one source table respectively, the metadata store being configured to comprise metadata descriptive of the at least one target table, the method comprising:
   receiving a transaction, referred to as main transaction, the main transaction comprising a set of change records of the at least one source table, each change record representing a data record of a source table of the at least one source table, wherein the main transaction involving one or more source tables, referred to as transaction source tables, of the at least one source table, wherein the main transaction can involve more than one source table in case the at least one source table is multiple source tables, the method further comprising:
   in response to receiving the main transaction, creating, in the metadata store, target table metadata associated with the one or more transaction source tables respectively, each target table metadata being descriptive of target partitions of a target table associated with the transaction source table, the metadata comprising the target table metadata;
   determining at least one subset of change records of the set of change records where each subset of change records represents a distinct source partition of the at least one source table;
   determining a transaction, referred to as sub-transaction, per subset of change records of the at least one subset of change records, resulting in a set of one or more sub-transactions;
   for each sub-transaction of the set of sub-transactions:
      creating, in the data store, if not yet created, one or more target partitions which are associated with a source partition of the sub-transaction in accordance with a partition scheme of the target database system;
   executing the main transaction, wherein the executing comprises executing a sub-transaction in the set of sub-transactions concurrently to each other sub-transaction in the set, wherein the executing of each sub-transaction of the set of sub-transactions comprises:
      concurrently configuring the data store; and
      configuring the metadata store in accordance with the sub-transaction, wherein the configuring of the data store and the metadata store in accordance with the sub-transaction comprises storing data of the source partition of the sub-transaction in the associated one or more target partitions and configuring the target table metadata in accordance with the sub-transaction.

2. The method of claim 1, wherein the at least one source table is partitioned into the source partitions in accordance with a first partition scheme, the target database system being configured to partition the target table into target partitions in accordance with a second partition scheme, wherein the first partition scheme is the same or different from the second partition scheme, wherein in case the second partition scheme is the first partition scheme, the source partition is associated with a respective target partition, wherein in case the second partition scheme is different from the first partition scheme, the source partition is associated with respective one or more target partitions.

3. The method of claim 1, further comprising:
   after performing the execution of the set of sub-transactions, creating in the data store a target table version per transaction source table;
   storing data descriptive of the created one or more target partitions in the respective created target table versions; and
   controlling the target database system to use the target table metadata of each created target table version for access to target partitions of the created target table version.

4. The method of claim 3, the target database system being configured to use current versions in the data store and in the metadata store for processing queries, the method further comprising:

marking each of the created target table metadata as an upcoming version and each of the created target table versions as an upcoming version, wherein the target database system is configured to use the upcoming versions as the current versions in response to a completion of the execution of the main transaction.

5. The method of claim 1, the executing of the sub-transaction comprising performing a commit of the sub-transaction, wherein the executing of the main transaction comprises performing a commit of the main transaction in response to determining that the commit of all sub-transactions is performed.

6. The method of claim 1, the main transaction representing a load request for loading one or more source partitions of the at least one source table, wherein the change records of the main transaction reference to data records of the one or more source partitions respectively.

7. The method of claim 1, wherein each change record of the main transaction is descriptive of a change of one or more data records of a source partition of the at least one source table.

8. The method of claim 1, further comprising:
in response to determining that the main transaction represents a load request for loading one or more source partitions of the at least one source table and that the first partition scheme is the same as the second partition scheme performing the execution of the sub-transaction partition-wise.

9. The method of claim 1, the main transaction involving one or more source tables, referred to as transaction source tables, of the at least one source table, the metadata comprising target table metadata associated with the one or more transaction source tables respectively, each target table metadata being descriptive of target partitions of a target table associated with the transaction source table, the method further comprising:
upon receiving the main transaction and before completion of the execution of the main transaction marking in the target table metadata data records of the data store which are replaced by the data records represented with the change records as deleted records.

10. The method of claim 9, the target table metadata comprising links to partitions which can be accessed by the target database system, the marking comprising removing from the target table metadata links to the partitions of the data store which are replaced by the data records represented with the change records.

11. The method of claim 1, further comprising:
in response to determining that the main transaction represents an incremental update request performing the execution of the sub-transaction selectively on records of the source partition.

12. The method of claim 1, wherein the determining of at least one subset of change records is performed using identifiers of the source partitions, wherein the identifiers are part of the main transaction or part of the metadata.

13. The method of claim 1, wherein the data analysis system being a data Lakehouse.

14. The method of claim 1, wherein the main transaction involving one source table of the at least one source table.

15. The method of claim 1, wherein the at least one source table being multiple source tables, the main transaction involving multiple source tables of the at least one source table, wherein the concurrent execution of the sub-transactions is performed per involved source table or for all involved source tables.

16. A computer program product comprising a computer-readable storage medium having computer-readable program code embodied therewith, the computer-readable program code configured to implement a method comprising:
receiving a transaction, referred to as main transaction, the main transaction comprising a set of change records of the at least one source table, each change record representing a data record of a source table of the at least one source table, wherein the main transaction involving one or more source tables, referred to as transaction source tables, of the at least one source table, wherein the main transaction can involve more than one source table in case the at least one source table is multiple source tables, the method further comprising:
in response to receiving the main transaction, creating, in the metadata store, target table metadata associated with the one or more transaction source tables respectively, each target table metadata being descriptive of target partitions of a target table associated with the transaction source table, the metadata comprising the target table metadata;
determining at least one subset of change records of the set of change records where each subset of change records represents a distinct source partition of the at least one source table;
determining a transaction, referred to as sub-transaction, per subset of change records of the at least one subset of change records, resulting in a set of one or more sub-transactions;
for each sub-transaction of the set of sub-transactions:
creating, in the data store, if not yet created, one or more target partitions which are associated with a source partition of the sub-transaction in accordance with a partition scheme of the target database system;
executing the main transaction, wherein the executing comprises executing a sub-transaction in the set of sub-transactions concurrently to each other sub-transaction in the set, wherein the executing of each sub-transaction of the set of sub-transactions comprises:
concurrently configuring the data store; and
configuring the metadata store in accordance with the sub-transaction, wherein the configuring of the data store and the metadata store in accordance with the sub-transaction comprises storing data of the source partition of the sub-transaction in the associated one or more target partitions and configuring the target table metadata in accordance with the sub-transaction.

17. A computer system comprising a hardware processor for data synchronization in a data analysis system, the data analysis system comprising a source database system and a target database system, the source database system comprising at least one source table, wherein the at least one source table comprises partitions, referred to as source partitions, the target database system comprising a data store and a metadata store, the data store being configured to comprise at least one target table corresponding to the at least one source table respectively, the metadata store being configured to comprise metadata descriptive of the at least one target table, the computer system being configured for:
receiving a transaction, referred to as main transaction, the main transaction comprising a set of change records of the at least one source table, each change record representing a data record of a source table of the at least one source table, wherein the main transaction involving one or more source tables, referred to as transaction source tables, of the at least one source table, wherein the main transaction can involve more than one source table in case the at least one source table is multiple source tables, the method further comprising:

in response to receiving the main transaction, creating, in the metadata store, target table metadata associated with the one or more transaction source tables respectively, each target table metadata being descriptive of target partitions of a target table associated with the transaction source table, the metadata comprising the target table metadata;

determining at least one subset of change records of the set of change records where each subset of change records represents a distinct source partition of the at least one source table; determining a transaction, referred to as sub-transaction, per subset of change records of the at least one subset of change records, resulting in a set of one or more sub-transactions;

for each sub-transaction of the set of sub-transactions:
creating, in the data store, if not yet created, one or more target partitions which are associated with a source partition of the sub-transaction in accordance with a partition scheme of the target database system;

controlling the target database system to execute the main transaction, the executing comprises executing a sub-transaction in the set of sub-transactions concurrently to each other sub-transaction in the set, wherein the executing of each sub-transaction of the set of sub-transactions comprises:

concurrently configuring the data store; and configuring the metadata store in accordance with the sub-transaction, wherein the configuring of the data store and the metadata store in accordance with the sub-transaction comprises storing data of the source partition of the sub-transaction in the associated one or more target partitions and configuring the target table metadata in accordance with the sub-transaction.

18. The computer system of claim 17, being part of the source database system or the target database system or a data synchronization system which is configured to connect to the source database system and the target database system.

19. The computer system of claim 18, the data analysis system being a data Lakehouse.

* * * * *